US012754847B2

(12) United States Patent
Chaffin et al.

(10) Patent No.: US 12,754,847 B2
(45) Date of Patent: Oct. 6, 2026

(54) SYSTEM AND METHOD FOR HANDLING CACHE UPDATES

(71) Applicant: Ampere Computing LLC, Santa Clara, CA (US)

(72) Inventors: Benjamin Crawford Chaffin, Portland, OR (US); Jonathan Christopher Perry, Portland, OR (US); Thomas Paul Schwabel, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 55 days.

(21) Appl. No.: 18/491,274

(22) Filed: Oct. 20, 2023

(65) Prior Publication Data

US 2025/0130945 A1 Apr. 24, 2025

(51) Int. Cl.

| | |
|---|---|
| ***G06F 3/00*** | (2006.01) |
| ***G06F 12/00*** | (2006.01) |
| ***G06F 12/0846*** | (2016.01) |
| ***G06F 12/0897*** | (2016.01) |

(52) U.S. Cl.
CPC ...... *G06F 12/0846* (2013.01); *G06F 12/0897* (2013.01); *G06F 2212/1024* (2013.01)

(58) Field of Classification Search
CPC ............. G06F 12/0846; G06F 12/0897; G06F 2212/1024
USPC .......................................................... 711/122
See application file for complete search history.

(56) References Cited

U.S. PATENT DOCUMENTS 5,809,530 A * 9/1998 Samra ................. G06F 12/0897 711/119
6,366,984 B1 * 4/2002 Carmean ............. G06F 12/0804 711/119
7,779,307 B1 * 8/2010 Favor .................. G06F 11/1407 714/45
7,877,630 B1 * 1/2011 Favor .................... G06F 9/3854 714/45
8,010,745 B1 * 8/2011 Favor .................... G06F 9/3834 711/146
8,019,944 B1 * 9/2011 Favor .................... G06F 9/3826 711/146
8,024,522 B1 * 9/2011 Favor .................... G06F 9/3808 711/146
8,051,247 B1 * 11/2011 Favor .................... G06F 9/3863 711/146
8,370,576 B1 * 2/2013 Favor .................. G06F 12/0855 711/146
8,370,609 B1 * 2/2013 Favor .................... G06F 9/3834 712/225

(Continued)

OTHER PUBLICATIONS

2025.*

*Primary Examiner* — Sheng Jen Tsai
(74) *Attorney, Agent, or Firm* — Muncy, Geissler, Olds & Lowe, P.C.

(57) ABSTRACT

A method of controlling a cache memory is disclosed. In an aspect, the method comprises receiving two or more store requests, wherein each store request is associated with a respective data unit for storage in the cache memory; and concurrently storing the respective data units associated with the two or more store requests to a given cache line of the cache memory in a single cache update operation based on determining that the respective data units associated with the two or more store requests are designated for storage in the given cache line.

20 Claims, 6 Drawing Sheets

(56) References Cited

U.S. PATENT DOCUMENTS

| | | | | |
|---|---|---|---|---|
| 11,481,332 | B1 * | 10/2022 | Favor | G06F 12/0864 |
| 2006/0026369 | A1 * | 2/2006 | Yamazaki | G06F 9/30181 712/E9.046 |
| 2006/0047664 | A1 * | 3/2006 | Suzuki | G06F 11/2074 714/E11.107 |
| 2007/0050564 | A1 * | 3/2007 | Gunna | G06F 12/0831 711/146 |
| 2010/0064107 | A1 * | 3/2010 | Eddy | G06F 12/0859 711/146 |
| 2011/0153951 | A1 * | 6/2011 | Strumpen | G06F 12/0811 711/E12.024 |
| 2013/0304991 | A1 * | 11/2013 | Bottcher | G06F 12/1054 711/E12.024 |
| 2017/0060759 | A1 * | 3/2017 | Guthrie | G06F 9/30043 |
| 2017/0060760 | A1 * | 3/2017 | Guthrie | G06F 3/0613 |
| 2017/0060761 | A1 * | 3/2017 | Guthrie | G06F 9/3824 |
| 2017/0060762 | A1 * | 3/2017 | Guthrie | G06F 9/30043 |
| 2017/0118242 | A1 * | 4/2017 | Georgescu | H04L 63/1425 |
| 2019/0042110 | A1 * | 2/2019 | Bharadwaj | G06N 20/00 |
| 2019/0114255 | A1 * | 4/2019 | Jain | G06F 3/068 |
| 2019/0205244 | A1 * | 7/2019 | Smith | G06F 3/065 |
| 2020/0081864 | A1 * | 3/2020 | Roberts | G06F 13/1673 |
| 2022/0357955 | A1 * | 11/2022 | Favor | G06F 9/3834 |
| 2022/0358037 | A1 * | 11/2022 | Favor | G06F 12/1045 |
| 2022/0358038 | A1 * | 11/2022 | Favor | G06F 12/0864 |
| 2022/0358039 | A1 * | 11/2022 | Favor | G06F 12/0895 |
| 2022/0358040 | A1 * | 11/2022 | Favor | G06F 9/3861 |
| 2022/0358044 | A1 * | 11/2022 | Favor | G06F 12/0811 |
| 2022/0358045 | A1 * | 11/2022 | Favor | G06F 12/1036 |
| 2022/0358046 | A1 * | 11/2022 | Favor | G06F 12/1045 |
| 2022/0358047 | A1 * | 11/2022 | Favor | G06F 12/0891 |
| 2022/0358048 | A1 * | 11/2022 | Favor | G06F 12/0804 |
| 2022/0358052 | A1 * | 11/2022 | Favor | G06F 12/0864 |
| 2022/0405125 | A1 * | 12/2022 | Williams | G06F 9/30123 |

* cited by examiner

SYSTEM AND METHOD FOR HANDLING CACHE UPDATES

BACKGROUND OF THE DISCLOSURE

1. Field of the Disclosure

The technology of this disclosure relates generally to the cache memory systems used in central processing units, and specifically to the handling of cache memory updates in such cache memory systems.

2. Description of the Related Art

In computer architecture, the Central Processing Unit (CPU) is the cornerstone, responsible for executing instructions and processing data. However, the processor's speed often surpasses that of the main memory, leading to potential bottlenecks in data access. To bridge the speed disparity between the processor and main memory, a hierarchical memory system is employed. This hierarchy typically consists of several layers of memory storage, each differing in size, speed, and proximity to the processor.

Situated between the main memory and the processor, cache memory serves as a high-speed computer memory that provides high-speed data access to the processor and stores frequently used computer programs, applications, and data. Cache memory provides faster data storage and access by storing instances of programs and data routinely accessed by the processor.

The integration of cache memory and main memory with the processor is crucial for optimizing system performance. By minimizing the time the processor spends waiting for data retrieval from main memory, cache memory ensures that the processor operates at its maximum efficiency.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of controlling a cache memory includes receiving two or more store requests, wherein each store request is associated with a respective data unit for storage in the cache memory; and concurrently storing the respective data units associated with the two or more store requests to a given cache line of the cache memory in a single cache update operation based on determining that the respective data units associated with the two or more store requests are designated for storage in the given cache line.

In an aspect, a processing unit includes a processor core; cache memory; and a cache memory controller, wherein the cache memory controller is configured to receive two or more store requests from the processing core, wherein each store request is associated with a respective data unit for storage in the cache memory, and concurrently store the respective data units associated with the two or more store requests to a given cache line of the cache memory in a single cache update operation based on determining that the respective data units associated with the two or more store requests are designated for storage in the given cache line.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
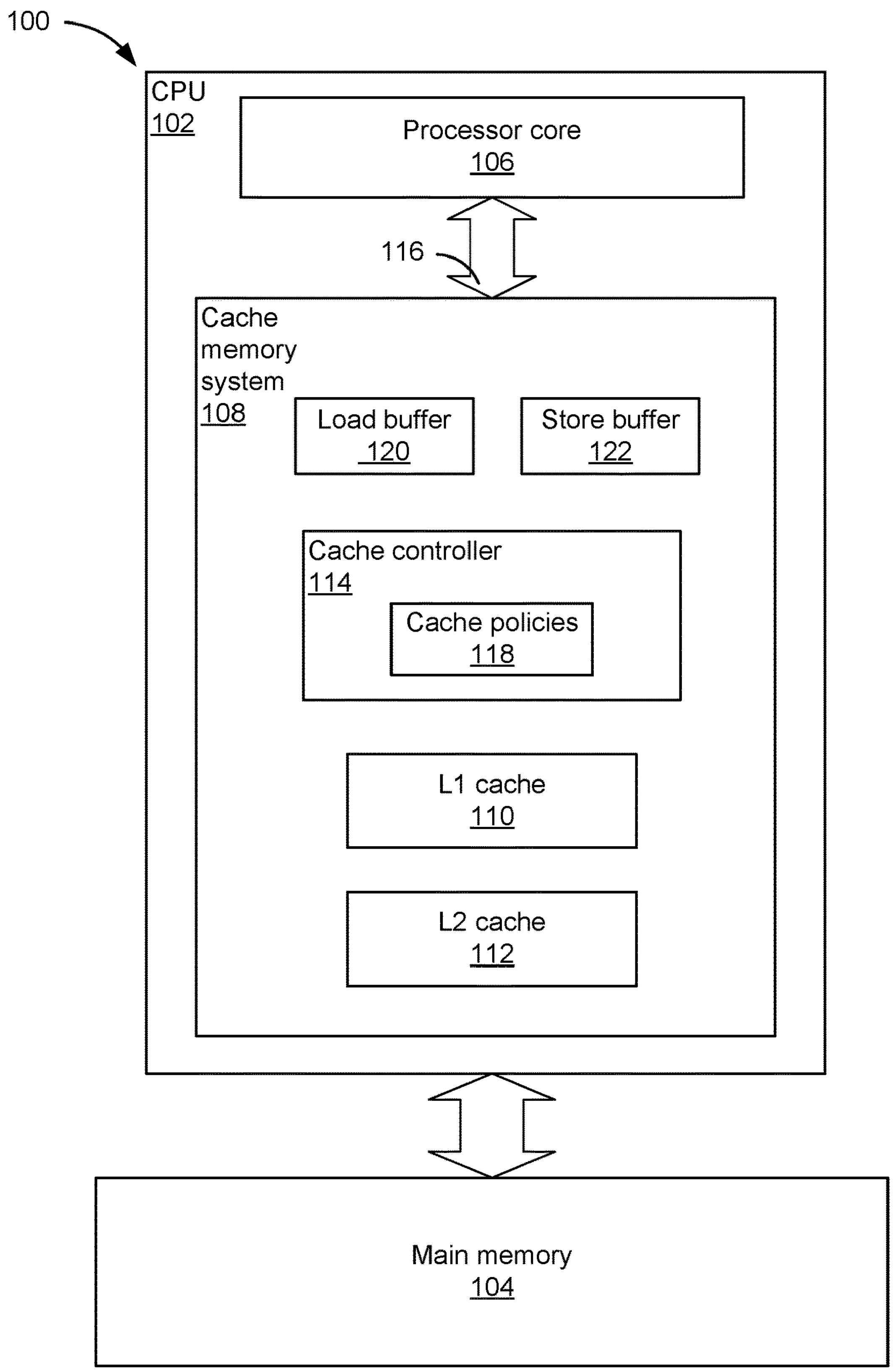
FIG. 1 shows a processing system, according to aspects of the disclosure.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

In processing systems, the central processing unit (CPU) undertakes the task of fetching data and instructions stored in the main memory of the processing system. Such instructions and data, stored in the computer's main memory, are processed at high speeds by the CPU. Yet, the time taken to retrieve these instructions from the main memory can introduce bottlenecks since the instructions and data are not immediately accessible to the CPU given the latency associated with the main memory. This latency can hinder the CPU's potential, necessitating a solution to expedite data and instruction access. To address this issue, processing systems use cache memory to mediate memory transactions between the CPU and main memory.

FIG. 1 shows a processing system 100, according to aspects of the disclosure. In this example, the processing system 100 includes a CPU 102 and main memory 104. The CPU 102 includes a processor core 106 and a cache memory system 108. Although the CPU 102 is shown with a single processor core 106 and cache memory system 108, it will be recognized that the CPU 102 may include multiple processing cores and corresponding cache memory systems.

In accordance with various aspects of the disclosure, the cache memory system 108 may include multiple cache memory levels. In FIG. 1, the cache memory system 108 includes two levels of cache, a level one (L1) cache 110 and level 2 (L2) cache 112. In an aspect, cache memory system 108 includes a cache controller 114 that responds to memory access requests (e.g., read and write requests for data stored in specific memory locations in main memory 104 as presented by the processor core 106 on processor core bus 116) to coordinate access to the L1 cache 110, L2 cache 112, and main memory 104. The cache controller 114 coordinates this access based on cache policies, shown generically as cache policies 118. The cache policies 118 may be implemented at the cache controller 114 through software, hardware, firmware, or any combination thereof.

In an aspect, the L1 cache 110 may be used as the initial means of reducing delays associated with accessing data from the main memory 104. Situated within or in close proximity to the processor core 106 of the CPU 102, the L1 cache 110 may be implemented using high-speed memory that is used to retain frequently accessed data and instructions. By doing so, the L1 cache 110 offers the processor core 106 rapid access to this information, bypassing the need to engage with the slower main memory 104 with every memory transaction. The strategic placement and high access speed associated with the L1 cache 110 ensure that the processor core 106 can retrieve data with minimal latency when compared to direct access of the same data from the main memory 104. In an aspect, the L1 cache 110, cache controller 114, or both may be integrated with the processor core 106. For simplicity, however, the components of the cache memory system 108 and processor core 106 are shown as distinct components.

Although the L1 cache 110 substantially reduces the latency associated with data access by the processor core 106, the L1 cache 110, as a practical matter, has size and cost constraints. In an aspect, the L1 cache 110 may have a storage capacity ranging from 16 kilobytes to 128 kilobytes. Given such limitations, the cache memory system 108 may include a further level of cache memory, shown in FIG. 1 as the L2 cache 112. Positioned between the L1 cache 110 and main memory 104, the L2 cache 112 typically has a larger storage capacity than the L1 cache. When the L1 cache experiences a cache miss (i.e., the required data is not present), the cache controller 114 searches for the required data in the L2 cache 112. Serving as an intermediary, the L2 cache 112 diminishes the frequency with which the processor core 106 resorts to the main memory 104, even when the required data is not found in the L1 cache 110. While the access speed associated with the L2 cache 112 typically does not match the access speed of the L1 cache 110, the L2 cache 112 is considerably faster than main memory 104, ensuring a balanced performance of the memory access hierarchy.

In accordance with various aspects of the disclosure, the cache controller 114 assists in implementing a controlled sequence of data access operations on behalf of the processor core 106. When the processor core 106 requires data, the request is placed by the processor core 106 on the processor core bus 116. Upon receiving the request from the processor core, the cache controller 114 directs its initial query for the requested data at the L1 cache 110. If successful (a cache hit), the data is relayed to the processor core 106. In instances of a cache miss in the L1 cache 110, the cache controller 114 directs its search for the requested data in the L2 cache 112. Discovering the data in the L2 cache prompts the cache controller 114 to transfer the requested data to both the L1 cache 110 and the processor core 106. However, if cache misses occur with respect to both the L1 cache 110 and L2 cache 112, the cache controller 114 may retrieve the requested data for the processor core 106 from the main memory 104. In an aspect, the L1 cache 110 and L2 cache 112 may both be updated with the requested data for subsequent lower-latency access by the processor core 106.

In accordance with certain aspects of the disclosure, cache memory system 108 may include a load buffer 120. In an aspect, the load buffer 120 may keep track of loads that have not yet been committed to the cache by the cache controller 114 but has not yet been consumed (used) by the processor core 106. To this end, when the processor core 106 issues a load instruction to read data from memory, the data might not be immediately available, especially if there is a cache miss. The load buffer keeps track of outstanding load operations. In an aspect, the data is fetched by the cache controller 114 from either the L1 cache 110, L2 cache 112, or main memory 104, and placed in the load buffer 120. When the processor core 106 is ready to use the data (i.e., when the instruction that requires the data is ready to execute), the data is retrieved from the load buffer 120.

The cache memory system 108 also operates to optimize the initial storage and updates of data that the processor core 106 indicates for storage in memory. With respect to such storage and updates, the cache memory system 108 receives store requests including the data and the address in main memory 104 to which the data is to be stored. In an aspect, the data and address are initially placed in a store buffer 122 in response to the store request. In an aspect, the cache memory system 108 first checks the L1 cache 110 to determine whether data associated with the address indicated by the store request has been previously stored in the L1 cache 110. If not (a cache-miss of the L1 cache 110), the cache memory system 108 checks the L2 cache 112 to determine whether data associated with the address indicated by the store request is located in the L2 cache 112. If not, the cache memory system 108 will take the necessary steps to store the data in the main memory 104.

In accordance with certain aspects of the disclosure, the cache controller 114 may implement write-through cache policies for updating the data at the addresses indicated in the store requests as found, for example, in the store buffer 122. For example, if data associated with an address indicated in a store request is found in the L1 cache 110, the cache memory system 108 may update the L1 cache 110 with new data. Since data associated with memory addresses in the L1 cache 110 is also found in the L2 cache 112, the cache controller 114 may implement a write-through cache policy in which the new data associated with the store request is concurrently updated in both the L1 cache 110 and L2 cache 112 to maintain consistency between the data contained in the caches. As will be explained in further detail herein, certain aspects of the disclosure are implemented with the recognition that current write-through cache policies present limitations with respect to data storage and power consumption associated with concurrent updates of both the L1 cache 110 and L2 cache 112.

Data is stored in cache memory in cache lines that correspond to blocks of data in the main memory 104. Both the L1 cache 110 and L2 cache 112 are organized in this manner, the principal difference being in the size of the caches (e.g., the L2 cache 112 typically having a larger storage capacity than the L1 cache 110).

Figure 2:
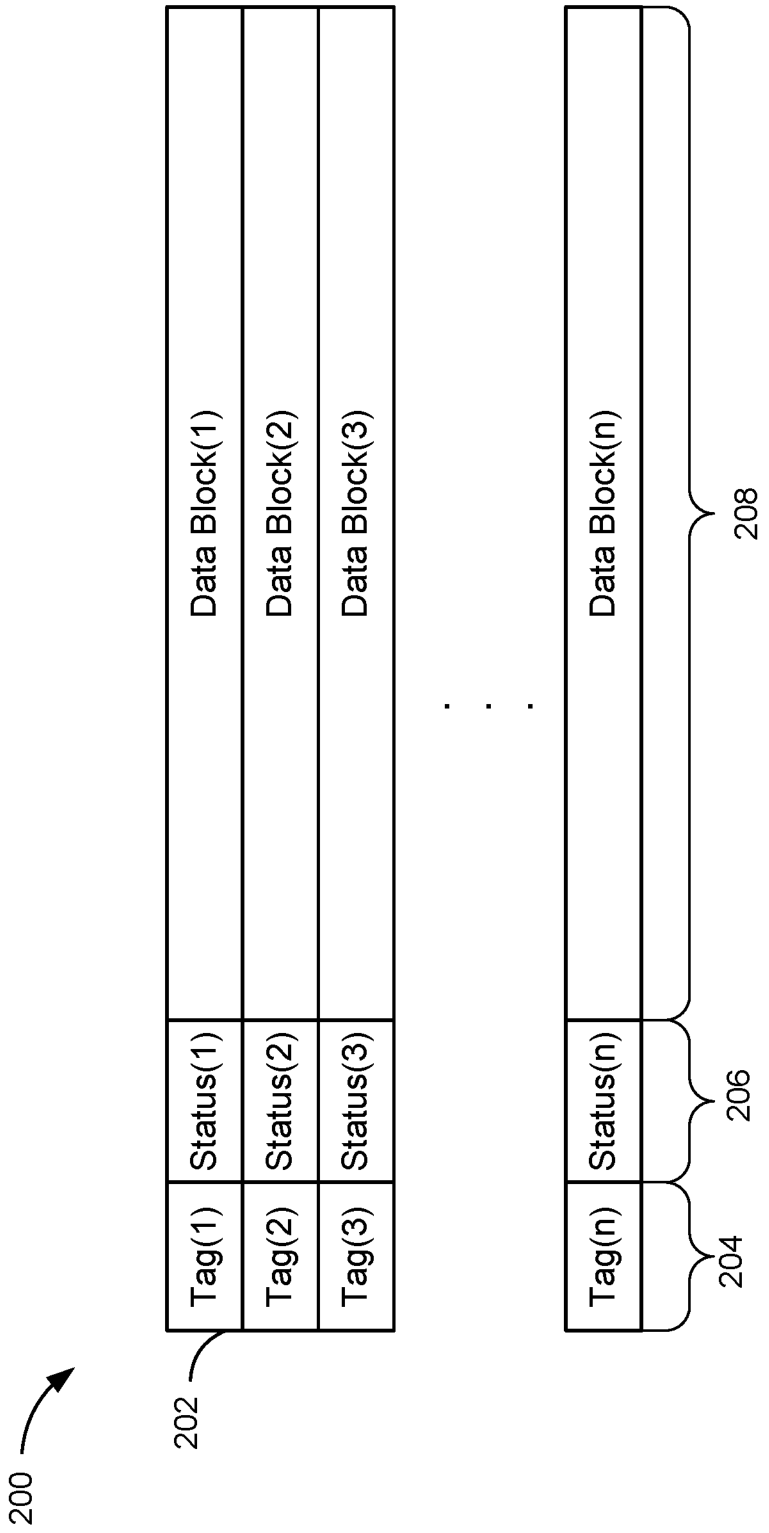
FIG. 2 shows an example logical organization of a cache, according to aspects of the disclosure.

FIG. 2 shows an example of the logical organization of a cache 200, according to aspects of the disclosure. In an aspect, the cache 200 includes a plurality of cache lines 202 numbering n, where n is typically larger for the L2 cache 112 than the L1 cache 110. In this example, each cache line 202 includes a tag field 204 (shown as Tag(1) through Tag(n), where (n) corresponds to an index number associated with each cache line), status bits 206 (shown as Status(1) through Status(n)), and data blocks 208 (shown as Data Block(1) through Data Block(n)).

The tag field 204 is derived from the address of the main memory 104 and uniquely identifies a block of main memory 104 with which the cache line 202 is associated. In an aspect, when a memory access occurs, a tag is derived from the memory address associated with the memory access. The derived tag associated with the memory access is compared with the tags stored in the cache to determine if there is a cache hit or miss. The size of the tag field 204 depends on the cache size, block size, and the cache's mapping technique (e.g., direct mapping, set-associative mapping, fully associative mapping, etc.).

The status bits 204 may include bits indicating the status of various aspects of the cache line 202. In various examples, the status bits 204 collectively enable the cache to store data, identify stored data, manage data validity and modifications, and implement replacement policies. The exact organization and size of these fields can vary based on the cache's design, size, and mapping technique.

In an aspect, the status bits 204 may include a "Valid Bit," which may be a binary flag that indicates whether the data in the cache line is valid or not. In an example, when the cache is powered up or reset, the valid bits associated with each cache line 202 are typically set to 0, indicating that the cache lines do not contain valid data. When data is fetched from main memory and stored in a cache line 202, the valid bit for that cache line may be set to 1.

In an aspect, status bits 204 for each cache line 202 may also include a "Dirty bit" or "Modified bit," which may be a binary flag indicating whether the data in the cache line 202 has been modified (written to) since it was fetched from main memory 104. In an aspect, the dirty/modified bit may be used in write-back caches to determine if the cache line needs to be written back to main memory 104 when the cache line 202 is evicted. If the dirty/modified bit is set, it may be used to indicate that the cache line 202 has been modified and must be written back to main memory 104. If the dirty/modified bit is clear, the cache line 202 may be deemed to be safely discarded without a write-back to the main memory 104.

In an aspect, the status bits 204 for each cache line 202 may include "Least Recently Used" (LRU) bits. In an example, the LRU bits may be used in set-associative and fully associative caches to implement an LRU replacement policy. In an aspect, the LRU bits may be used to keep track of the usage history of cache lines 202 within a set to determine which cache line should be evicted when the cache is full and a new line needs to be accessed from main memory 104. The number of LRU bits may be based on the number of lines in a set.

In an aspect, the status bits 204 for each cache line 202 may also include other control bits. In various examples, there might be other control bits, such as error-correcting code (ECC) bits for error detection and correction, depending on the architecture and specific cache design.

Figure 3:
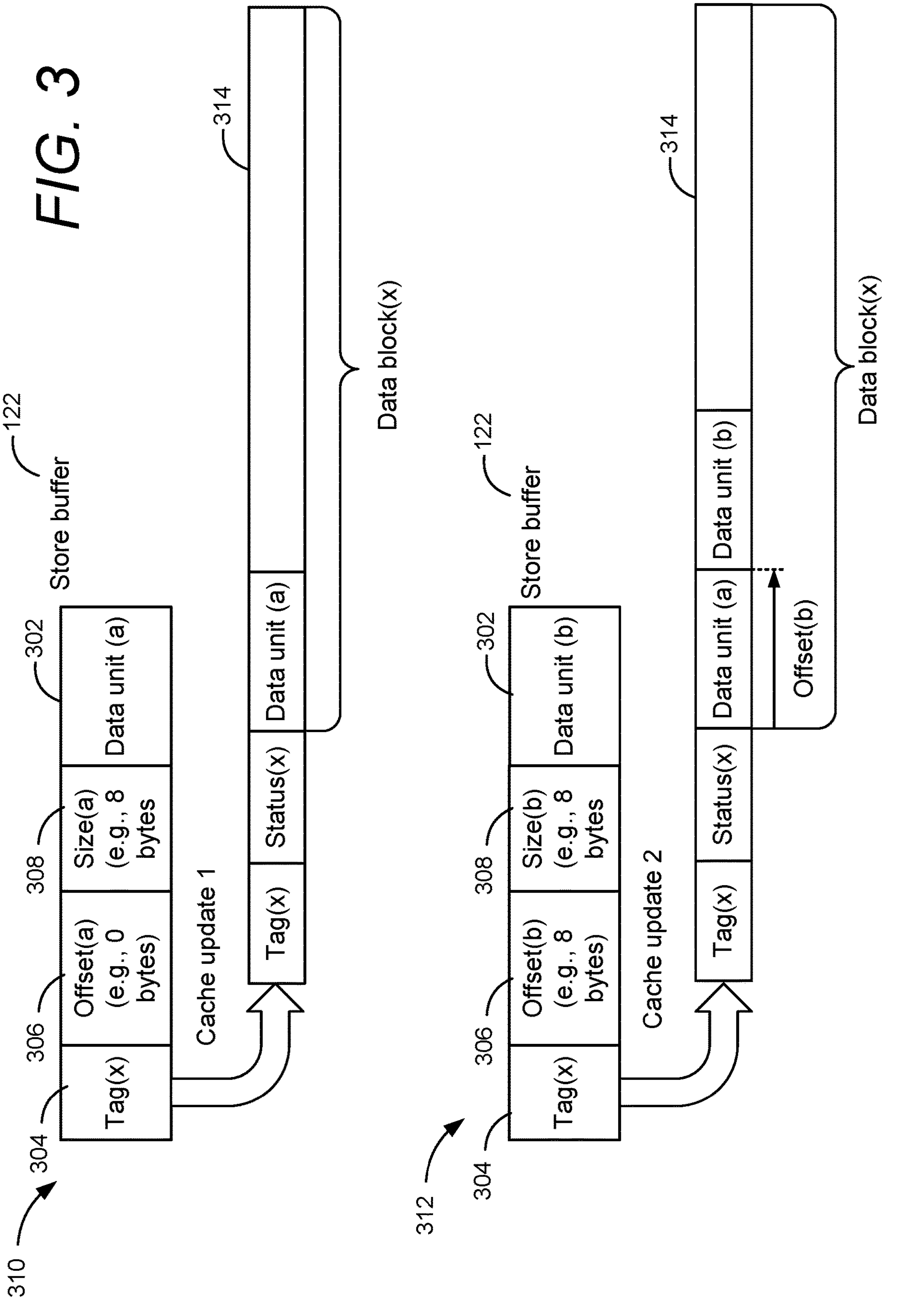
FIG. 3 illustrates a conventional manner of handling cache update operations, according to aspects of the disclosure.

FIG. 3 illustrates a conventional manner of handling cache update operations, according to aspects of the disclosure. In this example, storage information associated with the address and data associated with each store request received from the processor core 106 by the cache memory system 108 may stored in the store buffer 122. In an aspect, each store request is associated with a respective set of storage information in the store buffer 122. Here, the store buffer 122 includes a data unit 302 having the updated data associated with the store request, a tag field 304 corresponding to the main memory address associated with the data unit 302, an offset field 306 indicating an offset at which the data unit 302 is located within the location of the main memory associated with the main memory address, and a size field indicating the size of the data unit 302. In an aspect, the store buffer 122 may also store other store information (not shown).

FIG. 3 illustrates examples of update operations 310 and 312 associated with two different store requests. In this example, both store requests are associated with the same tag (Tag(x)) and, as such, the same cache line 314.

The first store request is associated with update operations 310. Here, the store buffer 122 holds the information associated with the first store request. In this example, the first store request includes updated data (Data unit(a)) having a size (Size(a) (e.g., 8 bytes)) that is to be stored at an offset (Offset(a), (e.g., 0 bytes)) within the data block (e.g., Data block(x)) of the cache line 314. The cache memory system executes a cache update operation (Cache update 1) to update the cache line 314 with the data from Data unit(a) based on the values for Offset(a) and Size(a).

The second store request is associated with update operations 312. Here, the store buffer 122 holds the information associated with the second store request. In this example, the second store request includes updated data (Data unit(b)) having a size (Size(b) (e.g., 8 bytes)) that is to be stored at an offset (Offset(b), (e.g., 8 bytes)) within the data block (e.g., Data block(x)) of the cache line 314. The cache memory system executes a second, separate cache update operation (Cache update 2) to update the cache line 314 with the data from Data unit(b) based on the values for Offset(b) and Size(b). After the second, separate cache operation has been committed, the cache line 314 holds the data associated with both Data unit(a) and Data unit(b). Any necessary updates to the status bits (Status (x)) are also made during the separate cache update operations. Further, as each store request is committed by the cache memory system 108, the corresponding store request entry in the store buffer 122 may be removed.

As illustrated in FIG. 3, the conventional manner of handling cache updates involves separate cache update operations for each store request, even where the store requests are directed to the same cache line. However, each cache update operation consumes a certain amount of power and introduces a certain amount of latency. When the cache memory system implements an L2 cache write-through, an additional amount of power and latency is introduced since the L2 cache is typically located further from the processor core than the L1 cache and is formed from a slower memory type. Still further, each cache access impacts overall bandwidth.

Certain aspects of the disclosure are implemented with a recognition that the store buffer may include store information associated with multiple store requests. In many instances, some of the multiple store requests may be associated with the same cache line (as indicated by Tag(x)). In certain scenarios, successive store requests are frequently made with respect to the same cache line.

In accordance with certain aspects of the disclosure, cache memory system 108 stores the data associated with multiple store requests addressed to the same cache line concurrently in a single cache update operation. In an aspect, two or more store requests directed to the same cache line may be committed in a single cache update operation thereby reducing the power consumed for the cache update operations and reducing cache access latency. Combining stores also allows the cache memory system 108 to execute more store instructions in the same amount of time previously needed to execute a single (uncombined) store.

Figure 4:
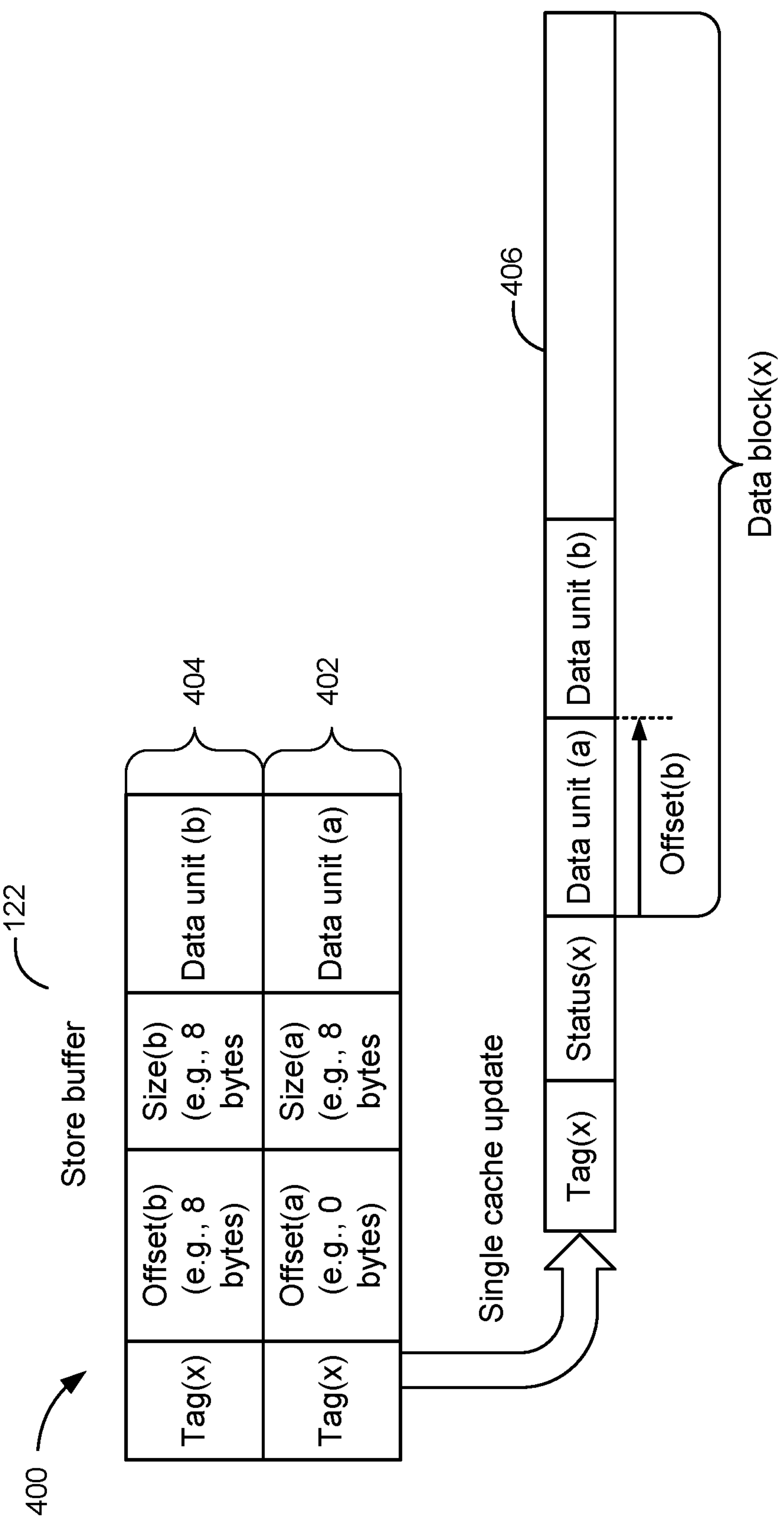
FIG. 4 shows an example cache update scenario in which multiple store requests to the same cache line are committed by the cache memory system in a single cache update operation, according to aspects of the disclosure.

FIG. 4 shows an example cache update scenario 400 in which multiple store requests to the same cache line are committed by the cache memory system in a single cache update operation, according to aspects of the disclosure. In this example, the cache memory system 108 has received two store requests and generated corresponding store request entries 402 and 404, both of which are associated with the same tag (Tag(x)) and, as such, the same cache line 406. In this example, the store request entry 402 includes updated data (Data unit(a)) having a size (Size(a), e.g., 8 bytes) that is to be stored at an offset (Offset(a), e.g., 0 bytes) within the data block(e.g., Data block(x)) of the cache line 406. The store request entry 404 includes updated data (Data unit(b)) having a size (Size(b), e.g., 8 bytes) that is to be stored at an offset (Offset(b), e.g., 8 bytes) within the data block (e.g., Data block(x)) of the cache line 406. In this example, it is assumed that the store request associated with store request entry 402 has occurred before the second store request associated with the store request entry 404.

In accordance with certain aspects of the disclosure, the cache controller 114 may monitor the store requests submitted by the processor core 106 by monitoring the store request entries in the store buffer 122. In this example, when the first store request is received at time t1 at which point the corresponding store request entry 402 is made in the store buffer 122. In an aspect, the cache controller 114 may search the contents of the store buffer 122 to determine whether there are any other prior uncommitted store request entries that are directed to the same cache line (e.g., cache line 406 as indicated by the same value for Tag(x)). If the second store request has not yet been made by the processor core 106, the store buffer 122 in this example only includes store request entry 402. As such, the store buffer 122 does not have any other store request entries with which store request entry 402 may be compared. In an aspect, the cache controller 114 may wait until one or more further store request entries are stored in the store buffer 122 and compare those subsequent store request entries with the store request entry 402 to determine whether any of the subsequent store request entries are directed to the same cache line.

In an aspect, the cache controller 114 may wait a threshold time duration after the store request entry 402 is detected before checking to determine whether other store request entries in the store buffer 122 are directed to the same cache line. If no such other store request entries are detected within the threshold time duration, the cache may be updated in a cache update operation that is solely directed to store request entry 402. If, however, one or more subsequent store request entries in the store buffer 122 are received within the threshold time duration and directed to the same cache line, all of the store request entries directed to the same cache line may be concurrently committed in a single cache update operation. Additionally, or in the alternative, the cache controller 114 may divide the store request entries directed to the same cache line into different sets for commitment during separate cache update operations. However, in such instances, the cache controller 114 may execute the cache update in a manner such that the total number of cache update operations used to commit the different sets of store request entries is less than the total number of store request entries directed to the same cache line (e.g., a first set of three store request entries directed to the same cache line are committed in a first cache update operation followed by commitment of a second set of two store request entries directed to the same cache line). In this manner, the benefits of committing multiple store request entries with a fewer number of cache update operations may be obtained.

Additionally, or in the alternative, the cache controller 114 may wait until a threshold number of store request entries have been stored in the store buffer 122 before determining whether there are uncommitted store request entries directed to the same cache line. Once the threshold number of store request entries have been stored, the cache controller 114 may determine whether there are any uncommitted store request entries that are directed to the same cache line that may be consolidated for commitment during the same cache update operation. In an aspect, store request entries within the threshold number of store request entries that are not directed to the same cache line may be committed in separate cache update operations. When the threshold number of store request entries is two, the cache controller 114 may compare the current store request entry (e.g., the most recently received store request entry) with the immediately preceding store request entry to determine whether both are directed to the same cache line. In an aspect, non-adjacent stores may also be subject to combined stores. In such scenarios, a limit may be placed on how far apart within the cache line the stores could be offset from one another. In certain scenarios, the cache controller 114 might wait until it has determined that there are no stores within that maximum distance before committing the store.

In the example shown in FIG. 4, it is assumed that the store request entry 404 meets the criterion for comparison with store request entry 402 (e.g., store request entry 404 occurs within the threshold time or within the threshold number of store request entries). As such, the cache controller 114 compares the store request entries 402 and 404 and determines that both store request entries are directed to the same cache line (e.g., the tag field values associated with both store request entries have the same value Tag(x)). As such, the cache controller 114 consolidates the store request entries 402 and 404 for commitment in a single cache update operation. As a result, the cache line 406 is updated with the data associated with both Data unit(a) and Data unit(b) during a single cache update operation. Additionally, any changes to the status bits (e.g., Status (x) may be made during the single cache update operation. In instances in which the cache controller 114 operates in accordance with an L2 cache write-through policy, the L1 cache and L2 cache may be updated during the same single operation. In an aspect, as each store request entry is committed, the store request entry may be removed immediately from the store buffer 122 and/or marked as completed and removed from the store buffer 122 at a subsequent time.

In the example shown in FIG. 4, Data unit(a) and Data unit(b) have the same data size (8 bytes) and are stored in immediately adjacent offset locations within Data block(x) (e.g., the data units are associated with contiguous memory locations within the main memory 104. However, the store request entries may be associated with different size data units and/or non-contiguous offset locations.

Figure 5:
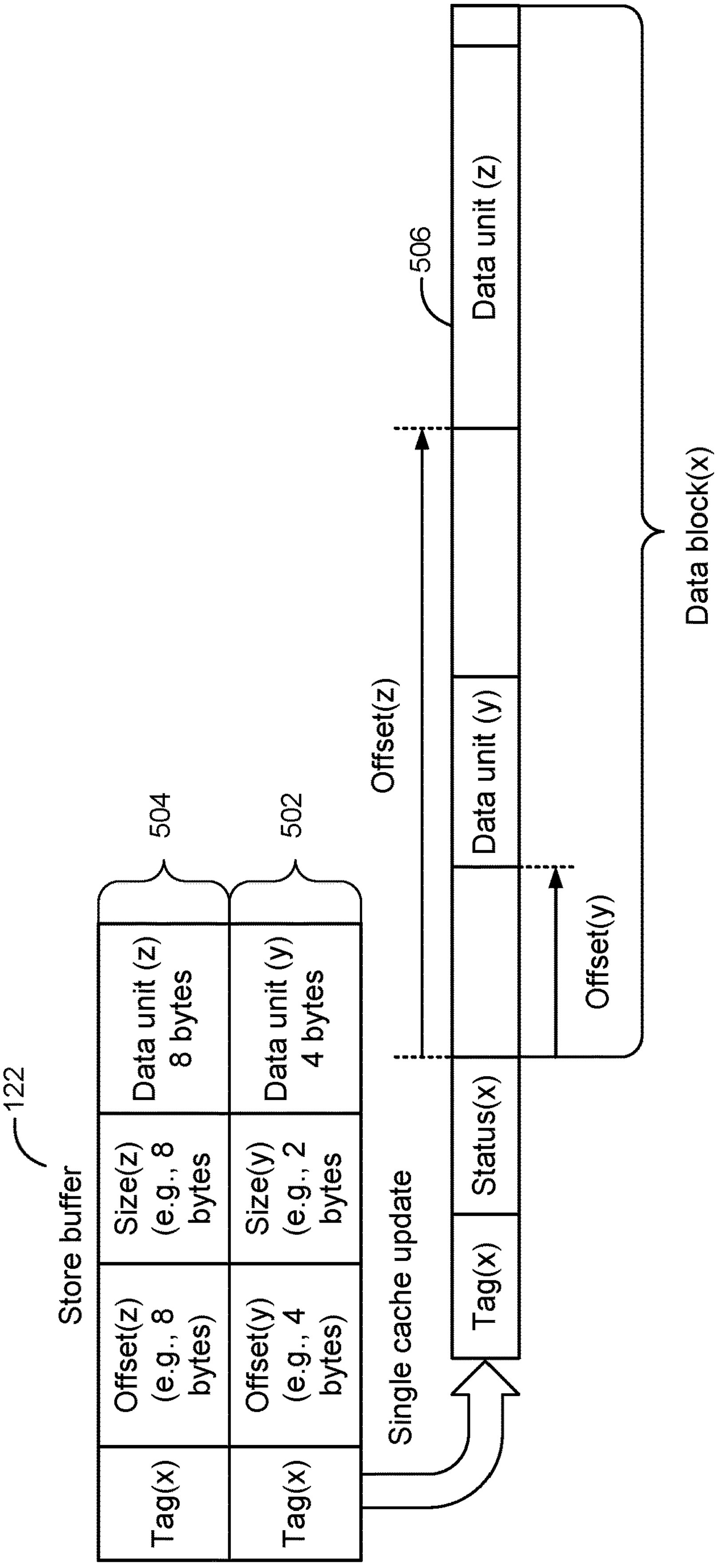
FIG. 5 shows an example cache update scenario in which multiple store requests to the same cache line are committed by the cache memory system in a single cache update operation, according to aspects of the disclosure.

FIG. 5 shows an example cache update scenario 500 in which multiple store requests to the same cache line are committed by the cache memory system in a single cache update operation, according to aspects of the disclosure. In the update scenario 500, unlike the scenario shown in FIG. 4, the data units associated with each store request have different sizes and are associated with non-contiguous offset locations. In this example, the cache memory system 108 has received two store requests and generated corresponding store request entries 502 and 504, both of which are associated with the same cache line 506 (e.g., Tag(x)). In this example, the store request entry 502 includes updated data (Data unit(y)) having a size (Size(y), e.g., 2 bytes) that is to be stored at an offset (Offset(y), e.g., 4 bytes) within the data block(e.g., Data block(x)) of the cache line 506. The store request entry 504 includes updated data (Data unit(z)) having a size (Size(z), e.g., 8 bytes) that is to be stored at an offset (Offset(z), e.g., 8 bytes) within the data block(e.g., Data block(x)) of the cache line 506. Since both store request entries 502 and 504 are directed to the same cache line 506, the cache controller 114 commits the store request entries 502 and 504 to the cache line 506 in a single cache update operation. The data (Data unit(y) and Data unit(z)) associated with the store request entries 502 and 504 are stored at the corresponding offsets (Offset(y) and Offset(z)) within Data block(x). Again, the store request entries 502 and 504 may be concurrently committed to both the L1 cache and the L2 cache in the same cache update operation, despite their combination of offsets and data sizes not being contiguous within the cache line 506.

Figure 6:
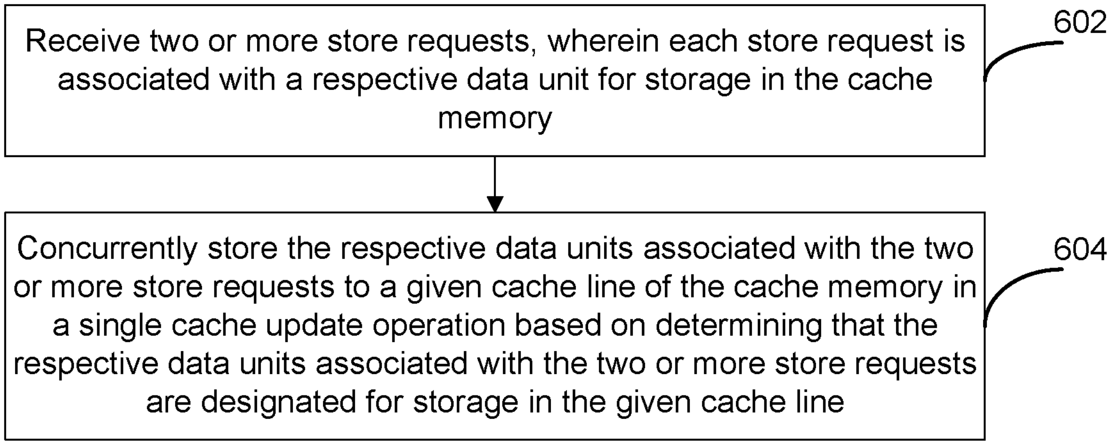
FIG. 6 illustrates an example method of controlling a cache memory, according to aspects of the disclosure.

FIG. 6 illustrates an example method 600 of controlling a cache memory, according to aspects of the disclosure. At operation 602, two or more store requests are received, wherein each store request is associated with a respective data unit for storage in the cache memory. At operation 604, the respective data units associated with the two or more store requests are concurrently stored to a given cache line of the cache memory in a single cache update operation based on determining that the respective data units associated with the two or more store requests are designated for storage in the given cache line.

In some aspects, the method includes concurrently storing the respective data units associated with the two or more store requests to the given cache line of the cache memory in the single cache update operation further based on determining that a total number of data bits of the respective data units associated with the two or more store requests is less than or equal to a threshold number of data bits.

In some aspects, the threshold number of data bits corresponds to a maximum number of data bits in the same cache line of the cache memory.

In some aspects, the two or more store requests are associated with contiguous offset locations.

In some aspects, the two or more store requests are associated with non-contiguous core offset locations.

In some aspects, the method includes storing an offset value for each respective data unit associated with the two or more store requests, wherein the offset value for each respective data unit corresponds to a location of the respective data unit in the given cache line.

In some aspects, the method includes storing a data size value for at least one respective data unit associated with the two or more store requests, wherein the data size value corresponds to a number of bits in the at least one respective data unit.

In some aspects, the cache memory comprises level one (L1) cache memory.

In some aspects, the cache memory further comprises level two (L2) cache memory.

In some aspects, the method includes concurrently updating both the L1 cache memory and the L2 cache memory during the single cache update operation.

In some aspects, the respective data units associated with the two or more store requests are each comprised of a same number of data bits.

In some aspects, the given cache line has a data block length of 128 bits; and the respective data units associated with the two or more store requests are each comprised of 64 bits.

As will be appreciated, a technical advantage of the method 600 is the reduction of the number of cache update operations that take place when two or more store requests are directed to the same cache line. Additionally, the method 600 allows faster peak rate of commit of stores. For example, certain aspects of the method facilitate a single commit store where multiple store instructions were previously required.

In the detailed description above, it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of controlling a cache memory, comprising: receiving two or more store requests, wherein each store request is associated with a respective data unit for storage in the cache memory; and concurrently storing the respective data units associated with the two or more store requests to a given cache line of the cache memory in a single cache update operation based on determining that the respective data units associated with the two or more store requests are designated for storage in the given cache line.

Clause 2. The method of clause 1, wherein: concurrently storing the respective data units associated with the two or more store requests to the given cache line of the cache memory in the single cache update operation is further based on determining that a total number of data bits of the respective data units associated with the two or more store requests is less than or equal to a threshold number of data bits.

Clause 3. The method of clause 2, wherein: the threshold number of data bits corresponds to a maximum number of data bits in the same cache line of the cache memory.

Clause 4. The method of any of clauses 1 to 3, wherein: the two or more store requests are associated with contiguous offset locations.

Clause 5. The method of any of clauses 1 to 3, wherein: the two or more store requests are associated with non-contiguous offset locations.

Clause 6. The method of clause 5, further comprising: storing an offset value for each respective data unit associated with the two or more store requests, wherein the offset value for each respective data unit corresponds to a location of the respective data unit in the given cache line.

Clause 7. The method of clause 6, further comprising: storing a data size value for at least one respective data unit associated with the two or more store requests, wherein the data size value corresponds to a number of bits in the at least one respective data unit.

Clause 8. The method of any of clauses 1 to 7, wherein: the cache memory comprises level one (L1) cache memory.

Clause 9. The method of clause 8, wherein: the cache memory further comprises level two (L2) cache memory.

Clause 10. The method of clause 9, further comprising: concurrently updating both the L1 cache memory and the L2 cache memory during the single cache update operation.

Clause 11. The method of any of clauses 1 to 10, wherein: the respective data units associated with the two or more store requests are each comprised of a same number of data bits.

Clause 12. The method of any of clauses 1 to 11, wherein: the given cache line has a data block length of 128 bits; and the respective data units associated with the two or more store requests are each comprised of 64 bits.

Clause 13. A processing unit, comprising: a processor core; cache memory; and a cache memory controller, wherein the cache memory controller is configured to receive two or more store requests from the processing core, wherein each store request is associated with a respective data unit for storage in the cache memory, and concurrently store the respective data units associated with the two or more store requests to a given cache line of the cache memory in a single cache update operation based on determining that the respective data units associated with the two or more store requests are designated for storage in the given cache line.

Clause 14. The processing unit of clause 13, wherein: the cache memory controller is further configured to concurrently store the respective data units associated with the two or more store requests to the given cache line of the cache memory in the single cache update operation based on determining that a total number of data bits of the respective data units associated with the two or more store requests is less than or equal to a maximum number of data bits in the same cache line of the cache memory.

Clause 15. The processing unit of any of clauses 13 to 14, wherein: the two or more store requests are associated with non-contiguous offset locations; and the cache memory controller is further configured to store an offset value for each respective data unit associated with the two or more store requests, wherein the offset value for each respective data unit corresponds to a location of the respective data unit in the given cache line, and store a data size value for at least one respective data unit associated with the two or more store requests, wherein the data size value corresponds to a number of bits in the at least one respective data unit.

Clause 16. The processing unit of any of clauses 13 to 15, wherein: the cache memory comprises level one (L1) cache memory.

Clause 17. The processing unit of clause 16, wherein: the cache memory further comprises level two (L2) cache memory.

Clause 18. The processing unit of clause 17, wherein the cache memory controller is further configured to: concurrently update both the L1 cache memory and the L2 cache memory during the single cache update operation.

Clause 19. The processing unit of any of clauses 13 to 18, wherein: the respective data units associated with the two or more store requests are each comprised of a same number of data bits.

Clause 20. The processing unit of any of clauses 13 to 19, wherein: the given cache line has a data block length of 128 bits; and the respective data units associated with the two or more store requests are each comprised of 64 bits.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A method of controlling a cache memory, comprising:

receiving a first store request;

storing a first store request entry corresponding to the first store request in a store buffer;

determining whether a threshold number of store request entries have been stored in the store buffer within a threshold time after receiving the first store request;

executing the first store request by storing a respective data unit associated with the first store request to a cache line of the cache memory in a cache update operation selected by cache-controller execution logic based on determining that the threshold number of store request entries have not been stored in the store buffer within the threshold time;

based on determining that the threshold number of store request entries have been stored in the store buffer within the threshold time, determining whether two or more store request entries of the threshold number of store request entries are designated for storage in a same cache line;

determining that respective data units associated with the two or more store request entries satisfy a condition permitting concurrent storage in a single cache update operation;

concurrently storing the respective data units associated with the two or more store requests to the same cache line of the cache memory in a single cache update operation selected by cache-controller execution logic based on determining that the two or more store requests are designated for storage in the same cache line and satisfy the condition permitting concurrent storage in a single cache update operation; and storing the respective data units associated with the two or more store requests in separate cache update operations based on determining that none of the two or more store requests are designated for storage in the same cache line or fail to satisfy the condition permitting concurrent storage in a single cache update operation.

2. The method of claim 1, wherein:

the condition permitting concurrent storage in a single cache update operation is based on determining that a total number of data bits of the respective data units associated with the two or more store requests is less than or equal to a threshold number of data bits.

3. The method of claim 2, wherein:

the threshold number of data bits corresponds to a maximum number of data bits in the same cache line of the cache memory.

4. The method of claim 1, wherein:

the condition permitting concurrent storage in a single cache update operation is based on the two or more store requests being associated with contiguous offset locations.

5. The method of claim 1, wherein:

the two or more store requests are associated with non-contiguous offset locations.

6. The method of claim 5, further comprising:

storing an offset value for each respective data unit associated with the two or more store requests, wherein the offset value for each respective data unit corresponds to a location of the respective data unit in the same cache line.

7. The method of claim 6, further comprising:

storing a data size value for at least one respective data unit associated with the two or more store requests, wherein the data size value corresponds to a number of bits in the at least one respective data unit.

8. The method of claim 1, wherein:

the cache memory comprises level one (L1) cache memory.

9. The method of claim 8, wherein:

the cache memory further comprises level two (L2) cache memory.

10. The method of claim 9, further comprising:

concurrently updating both the L1 cache memory and the L2 cache memory during the single cache update operation.

11. The method of claim 1, wherein:

the respective data units associated with the two or more store requests are each comprised of a same number of data bits.

12. The method of claim 1, wherein:

the same cache line has a data block length of 128 bits; and the respective data units associated with the two or more store requests are each comprised of 64 bits.

13. A processing unit, comprising:

a processor core;

cache memory; and a cache memory controller, wherein the cache memory controller is configured to receive a first store request;

store a first store request entry corresponding to the first store request in a store buffer;

determine whether a threshold number of store request entries have been stored in the store buffer within a threshold time after receiving the first store request;

execute the first store request by storing a respective data unit associated with the first store request to a cache line of the cache memory in a cache update operation selected by cache-controller execution logic based on determining that the threshold number of store request entries have not been stored in the store buffer within the threshold time;

based on determining that the threshold number of store request entries have been stored in the store buffer within the threshold time, determine whether two or more store request entries are designated for storage in a same cache line;

determine that respective data units associated with the two or more store request entries satisfy a condition permitting concurrent storage in a single cache update operation;

concurrently store the respective data units associated with the two or more store requests to the same cache line of the cache memory in a single cache update operation selected by cache-controller execution logic based on determining that the two or more store requests are designated for storage in the same cache line and satisfy the condition permitting concurrent storage in a single cache update operation; and storing the respective data units associated with the two or more store requests in separate cache update operations based on determining that none of the two or more store requests are designated for storage in the same cache line or fail to satisfy the condition permitting concurrent storage in a single cache update operation.

14. The processing unit of claim 13, wherein:

the condition permitting concurrent storage in a single cache update operation is based on determining that a total number of data bits of the respective data units associated with the two or more store requests is less than or equal to a maximum number of data bits in the same cache line of the cache memory.

15. The processing unit of claim 13, wherein:

the condition permitting concurrent storage in a single cache update operation is based on the two or more store requests being associated with contiguous offset locations.

16. The processing unit of claim 13, wherein:

the cache memory comprises level one (L1) cache memory.

17. The processing unit of claim 16, wherein:

the cache memory further comprises level two (L2) cache memory.

18. The processing unit of claim 17, wherein the cache memory controller is further configured to:

concurrently update both the L1 cache memory and the L2 cache memory during the single cache update operation.

19. The processing unit of claim 13, wherein:

the respective data units associated with the two or more store requests are each comprised of a same number of data bits.

20. The processing unit of claim 13, wherein:

the same cache line has a data block length of 128 bits; and the respective data units associated with the two or more store requests are each comprised of 64 bits.

* * * * *